US009146609B2

(12) United States Patent
Bose et al.

(10) Patent No.: US 9,146,609 B2
(45) Date of Patent: Sep. 29, 2015

(54) THREAD CONSOLIDATION IN PROCESSOR CORES (71) Applicant: International Business Machines Corporation, Armonk, NY (US)

(72) Inventors: Pradip Bose, Yorktown Heights, NY (US); Alper Buyuktosunoglu, White Plains, NY (US); Bryan S. Rosenburg, Cortlandt Manor, NY (US); Kyung D. Ryu, New York, NY (US); Augusto J. Vega, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 274 days.

(21) Appl. No.: 13/681,497

(22) Filed: Nov. 20, 2012

(65) Prior Publication Data
US 2014/0143783 A1  May 22, 2014

(51) Int. Cl.
G06F 9/46 (2006.01)
G06F 1/26 (2006.01)
G06F 1/00 (2006.01)
G06F 1/32 (2006.01)

(52) U.S. Cl.
CPC ............. *G06F 1/3246* (2013.01); *G06F 1/324* (2013.01); *G06F 1/3287* (2013.01); *G06F 1/3296* (2013.01); *Y02B 60/1217* (2013.01); *Y02B 60/1282* (2013.01); *Y02B 60/1285* (2013.01); *Y02B 60/32* (2013.01)

(58) Field of Classification Search
None
See application file for complete search history.

(56) References Cited

U.S. PATENT DOCUMENTS

| 2005/0149937 | A1* | 7/2005 | Pilkington | 718/102 |
| 2010/0037038 | A1* | 2/2010 | Bieswanger et al. | 712/220 |
| 2010/0146513 | A1* | 6/2010 | Song | 718/104 |
| 2011/0131580 | A1* | 6/2011 | Krishnamurthy et al. | 718/102 |
| 2012/0284729 | A1* | 11/2012 | Sharda et al. | 718/104 |

OTHER PUBLICATIONS

Xing Fu; Xiaorui Wang, Utilization-Controlled Task Consolidation for Power Optimization in Multi-core Real-Time Systems, Aug. 2011, IEEE, Embedded and Real-Time Computing Systems and Applications (RTCSA), 2011 IEEE 17th International Conference on , vol. 1, no., pp. 73, 82, 28-31.*
Eric Saxe, Power-Efficient Software, Jan. 2010, ACM, Queue, vol. 8, 1, pp. 10-17.*

(Continued)

*Primary Examiner* — Lewis A Bullock, Jr.
*Assistant Examiner* — Melissa Alfred
(74) *Attorney, Agent, or Firm* — Cantor Colburn LLP (57) ABSTRACT According to one embodiment, a method for thread consolidation is provided for a system that includes an operating system and a multi-core processing chip in communication with an accelerator chip. The method includes running an application having software threads on the operating system, mapping the software threads to physical cores in the multi-core processing chip, identifying one or more idle hardware threads in the multi-core processing chip and identifying one or more idle accelerator units in the accelerator chip. The method also includes executing the software threads on the physical cores and the accelerator unit. The method also includes the controller module consolidating the software threads executing on the physical cores, resulting in one or more idle physical cores and a consolidated physical core. The method also includes the controller module activating a power savings mode for the one or more idle physical cores.

9 Claims, 7 Drawing Sheets (56) References Cited

OTHER PUBLICATIONS

Rangan et al., "Thread Motion: Fine Grained Power Management for Multi-Core Systems," ISCA 09, Jun. 2009, 12 pages.
Cochran et al., "Pack & Cap: Adaptive DVFS and Tread Packing Under Power Caps," Micro 11, Dec. 2011, 11 pages.
Tam et al., "Thread Clustering: Sharing-Aware Scheduling on SMP-CMP=SMT Multiprocessors," Department of Electrical and Computer Engineering, EuroSys 07, Mar. 2007, 12 pages.
Eric Saxe, "Power-Efficient Software," Jan. 2010, ACM Queue, vol. 8, pp. 1-8.
U.S. Appl. No. 13/967,419; Non-final Office Action; Date Filed: Aug. 15, 2013; Date Mailed: Sep. 11, 2014; 46 pages.
Xing Fu et al., Utilization-Controlled Task Consolidation of Power Optimization in Multi-core Real-Time Systems, IEEE, Embedded and Real-Time Computing Systems and Applications (RTCSA, 2011 IEEE 17th International Conference, vol. 1, pp. 73-82.

\* cited by examiner

THREAD CONSOLIDATION IN PROCESSOR CORES

BACKGROUND

The present invention relates generally to computer systems, and more particularly to saving power in a computer system.

In computer systems having execution of a plurality of tasks, distribution of task execution is important to system performance. In systems having multiple processor cores and multi-threading operation, allocation of tasks or threads among cores can affect latency and/or power consumption. In cases where two or more threads executing on separate cores utilize the same data, maintaining coherency of the data between cores can affect thread execution time and latency.

SUMMARY

According to one embodiment, a method for thread consolidation is provided for a system that includes an operating system and a multi-core processing chip in communication with an accelerator chip. The method includes running an application having software threads on the operating system, mapping the software threads to physical cores in the multi-core processing chip, identifying one or more idle hardware threads in the multi-core processing chip and identifying one or more idle accelerator units in the accelerator chip. The method also includes executing the software threads on the physical cores and the accelerator unit. The method also includes the controller module consolidating the software threads executing on the physical cores, resulting in one or more idle physical cores and a consolidated physical core. The method also includes the controller module activating a power savings mode for the one or more idle physical cores. According to another embodiment, a method for thread consolidation in a system that includes a multi-core processing chip and an operating system is provided, where the method includes running an application having software threads on the operating system, mapping a first software thread to a first physical core in the multi-core processing chip, mapping a second software thread to a second physical core in the multi-core processing chip and executing the first software thread and second software thread on the first and second physical cores, respectively. The method also includes the controller module consolidating the first software thread and second software thread to execute in the first physical core, exchanging data between the first software thread and second software thread within the first physical core to reduce latency during execution and activating a power savings mode for the second physical core.

DETAILED DESCRIPTION

An embodiment is directed to a computer system with a multi-core processing chip and one or more accelerator chips. In embodiments, the system is configured to perform a method to reduce power consumption. The accelerator chips each include accelerator units or elements configured to execute tasks or threads that are assigned by a main processor (e.g., the multi-core processing chip) of a system. In one embodiment, the multi-core processing chip is a multi-thread enabled chip, where each core can support one or more software threads executing simultaneously in the core. In an embodiment, the accelerator chips are active memory devices. In embodiments, a compiler, located in the computer system or external to the system, receives an application and provides an executable module for execution on the multi-core processing chip and one or more accelerator chips. In embodiments, the executable module includes a first portion of code to be executed on cores of the multi-core processing chip and a second portion of code to be executed on accelerator units of the accelerator chip. In an embodiment, an application, such as an executable module, runs on an operating system (OS), where the application uses software threads for execution of the application, where the software threads are mapped to cores in the multi-core processing chip. One or more of the software threads may then off-load tasks to one or more available accelerator units in the accelerator chip. In embodiments where software threads off-load tasks to accelerator units, the software threads wait in the multi-core processing chip for the off-loaded accelerator tasks to complete. A controller module in the OS may consolidate software thread execution in cores of the multi-core processing chip, where threads may be reassigned from one core to another core, thus creating an idle core that activates a power savings mode to reduce power consumption.

In one embodiment, a computer system includes a multi-core processing chip and an OS. The system is configured to perform a method to reduce power consumption. In embodiments, a compiler receives an application and provides an executable module or application for execution by the multi-core processing chip. In an embodiment, an application, such as an executable module, runs on the operating system (OS), where the application has software threads that are mapped to cores in the multi-core processing chip. In an embodiment, software threads that execute on the cores of the processing chip may exchange data. In embodiments where software threads exchange data are located in different cores, data has to be moved between cores and/or replicated between cores. Data movement, replication and coherency maintenance may result in execution time overhead. Thus, a controller module in the OS may consolidate software threads in fewer cores to reduce data exchange between cores and its associated overhead. In addition, by consolidating thread execution in cores of the multi-core processing chip, threads are reassigned from one core to another core. In an embodiment, the core that loses threads to another core during consolidation may become an idle core that activates a power savings mode to reduce power consumption in the system. In addition, when a first hardware thread hosting a software thread in a physical core loses the software thread to a second hardware thread in a separate core, the thread consolidation causes the first hardware thread to become idle. In embodiments where all the hardware threads in one core become idle, the core is idle and can be switched to a power savings mode.

An embodiment is directed to a computer system including a memory device, such as an active memory device or active buffered memory device. The memory device may be any suitable memory device including one or more memory device (e.g., random access memory "RAM" chips) connected to a hub chip (also referred to as a memory controller chip) configured to control the memory device. In an embodiment, the active memory device includes layers of memory that form a three dimensional ("3D") memory device (also referred to as "memory cube") where individual columns of memory chips form stacks or vaults in communication with the hub chip. In one embodiment, a plurality of memory stacks are located on a memory module, where each stack has a respective hub chip. The hub chips may include a processing element configured to communicate with the memory and other processing elements in other hub chips. In an embodiment, a processing element accesses a selected address in a vault through an interconnect network. In one embodiment, a plurality of memory devices, stacks and processing elements may communicate via the interconnect network, such as a crossbar switch. In embodiments, a memory stack includes multiple DRAM dies stacked together, where each DRAM die is divided into a number of banks. Further, in the example, a group of banks in each die, vertically aligned, may be referred to as a vault accessed by a vault controller.

Embodiments include a memory stack with a processing element and memory controller in the hub chip, referred to as an active memory device. The active memory device can perform a complex set of operations using multiple locations (e.g., data stored at specific addresses) within the memory device as operands. A process is provided whereby instructions and operations are performed autonomously on these operands within the memory device. Instructions and operations may be stored within the memory device itself and are not dispatched from a main processor, wherein the stored instructions are provided to the processing elements for processing by the processing element in the memory device. In one embodiment, the processing elements are programmable engines, comprising an instruction buffer, an instruction unit, including branching capability and instruction decode, a mixture of vector, scalar, and mask register files, a plurality of load/store units for the movement of data between memory and the register files, and a plurality of execution units for the arithmetic and logical processing of various data types. Also included in the memory device are address translation capabilities for converting or translating virtual addresses to physical addresses, a unified Load/Store Queue to sequence data movement between the memory and the processing elements, and a processor communications unit, for communication with the main processor.

In an embodiment, the active memory device is configured to load configuration information or instructions from a part of the active memory device into a processing element following receiving a command from an external requestor, such as a main processor or another processing element. In addition, the processing element may perform virtual-to-real address translations that it computes while executing the loaded instructions.

In embodiments, it is desirable to have processing capabilities within an active memory device to reduce memory latency and energy consumption that would be experienced when the memory is being accessed by a processor residing in a separate chip. Instead of bringing data from memory to the separate processing chip through lower bandwidth communication paths, performing what are often quite simple calculations on the data, and then transferring the processed data back to memory, the system's main processor configures the processing elements within the active memory device, and then instructs them to carry out the data processing tasks. This may be achieved by sending one or more commands from the main processor to the device. In this scenario, the movement of data between the main processor and memory is greatly reduced, both in the distance it has to travel from the memory chips to the processor chip, and in the number of levels of cache that it has to traverse through the memory hierarchy.

Figure 1:
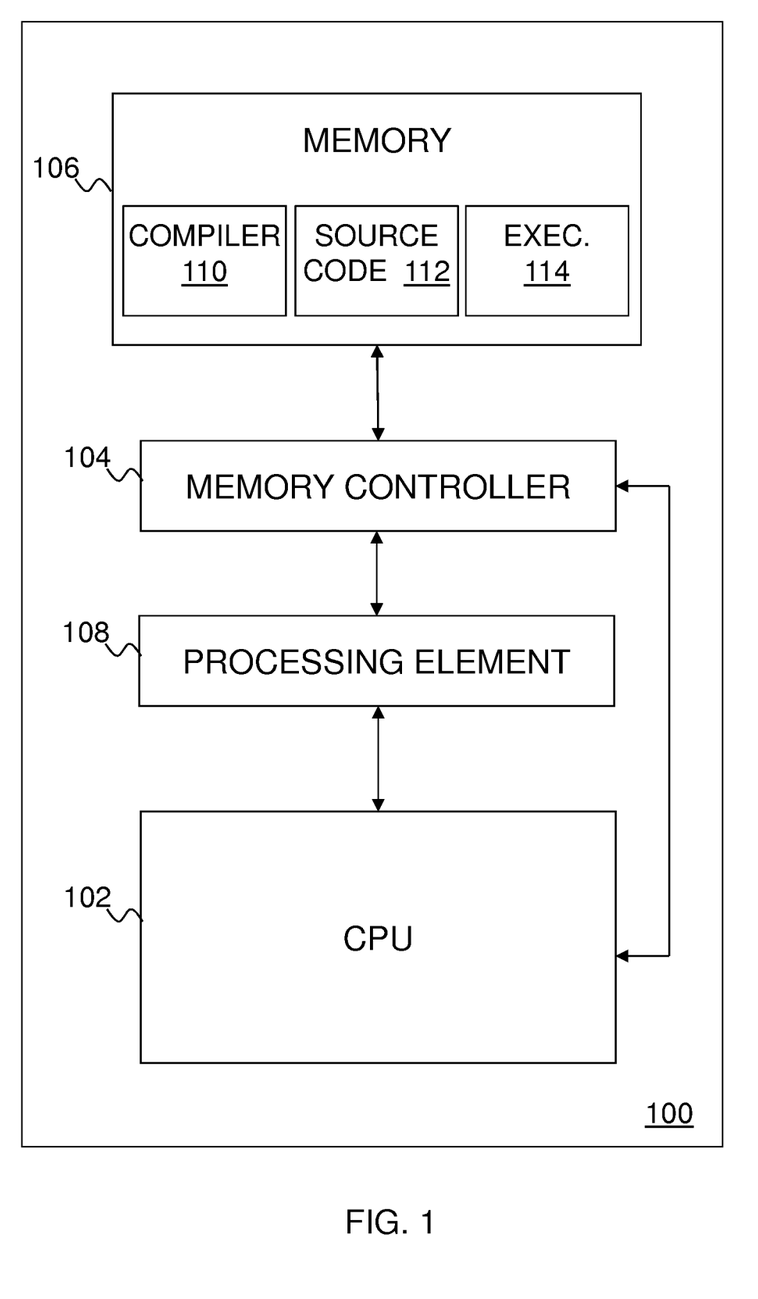
FIG. 1 illustrates a block diagram of a system for an active memory device in accordance with an embodiment.

FIG. 1 illustrates a block diagram of a system with a memory device accordance with an embodiment. A system 100 depicted in FIG. 1 includes a computer processor 102, a memory 106 having memory devices, as well as a memory controller 104 and processing element 108 for receiving data from the computer processor 102 to be stored in the memory 106. In an embodiment, the memory controller and processing element 108 may be referred to as a hub chip.

In one embodiment, the memory 106 and memory controller 104 is coupled to the computer processor 102 and processes write requests from the computer processor 102. In one example, the write requests contain data to be written to the memory 106 and a memory location of the instruction(s), where the instruction forms the virtual address for the data to be written. The memory controller 104 stores data at a real address within the memory 106. In another example, the computer processor 102 maps the virtual address to a real address in the memory 106 when storing or retrieving data. In the example, the write requests contain data to be written to the memory 106 and the real address identifying the location in the memory 106 to which the data will be written. The real address for a given logical address may change each time data in the memory 106 is modified.

In an embodiment, the command from the computer processor 106 specifies a sequence of instructions that include setup actions, execution actions and notification of completion actions. The setup actions may include configuration actions such as a command that loads configuration information from the memory within the memory device directly into the processing element 108. By providing the configuration information in the memory device, the processing element 108 is able to be properly configured after receiving a command. In an embodiment, configuration information may include information used to translate between virtual addresses and real addresses in the memory. Further, configuration information may include information to maintain coherence, by ensuring accuracy and consistency, of memory mapping and translation between the processing element and a requestor (e.g., main processor). The setup actions may also include the loading of code, such as a sequence of instructions, from the memory 106 into the processing element 108. The execution actions include execution of the code that includes load, store, arithmetic/logical and other instructions.

In an additional mode of an embodiment, the processing element 108 is coupled to the computer processor 102 and receives a command from the computer processor 102. The command corresponds to instructions stored in the memory to perform write requests for data to be written to the memory 106. In the embodiment, the instruction(s) executes and forms the virtual address corresponding to the write location in memory 106. The command may include a real address where the instruction(s) are stored. The memory controller 104 and/or processing element 108 stores data at a real address within the memory 106. In an embodiment, the processing element 108 maps the virtual address to a real address in the memory 106 when storing or retrieving data. The real address for a given logical address may change each time data in the memory 106 is modified. The computer processor 102 provides commands to the memory 106, where the processing element 108 receives the command and fetches corresponding instructions from the memory.

The system 100 is one example of a configuration that may be utilized to perform the processing described herein. Although the system 100 has been depicted with only a single memory 106, memory controller 104, processing element 108 and computer processor 102, it will be understood that other embodiments would also operate in other systems with two or more of the memory 106, memory controller 104, processing element 108 or computer processor 102. Further, embodiments may include fewer devices than depicted, such as a memory system with no processing element 108. In an embodiment, the memory 106, memory controller 104, processing element 108 and computer processor 102 are not located within the same computer. For example, the memory 106, processing element 108 and memory controller 104 may be located in one physical location (e.g., on a memory module) while the computer processor 102 is located in another physical location (e.g., the computer processor 102 accesses the memory controller 104 via a network). In addition, portions of the processing described herein may span one or more of the memory 106, memory controller 104, processing element 108 and computer processor 102.

The memory 106 may store one or more separate programs, each of which comprises an ordered listing of executable instructions for implementing logical functions. For example, software stored in the memory 106 may include an operating system (not shown), source code 112, and one or more applications. As shown in FIG. 1, the memory 106 stores source code 112 and a compiler 110. The compiler 110 may alternatively be stored and executed on a system that is external to the system 100 for which it produces executable programs, such as executable 114. The compiler 110 includes numerous functional components for implementing the features, processes, methods, functions, and operations of the exemplary embodiments, as will be described further herein. Optimized code is executed in a runtime environment (not shown) of the system 100.

The applications may include a source code 112, executable program (object code), script, or any other entity comprising a set of instructions to be performed. When the application is source code 112, the program code is translated via the compiler 110 to the executable 114.

Figure 2:
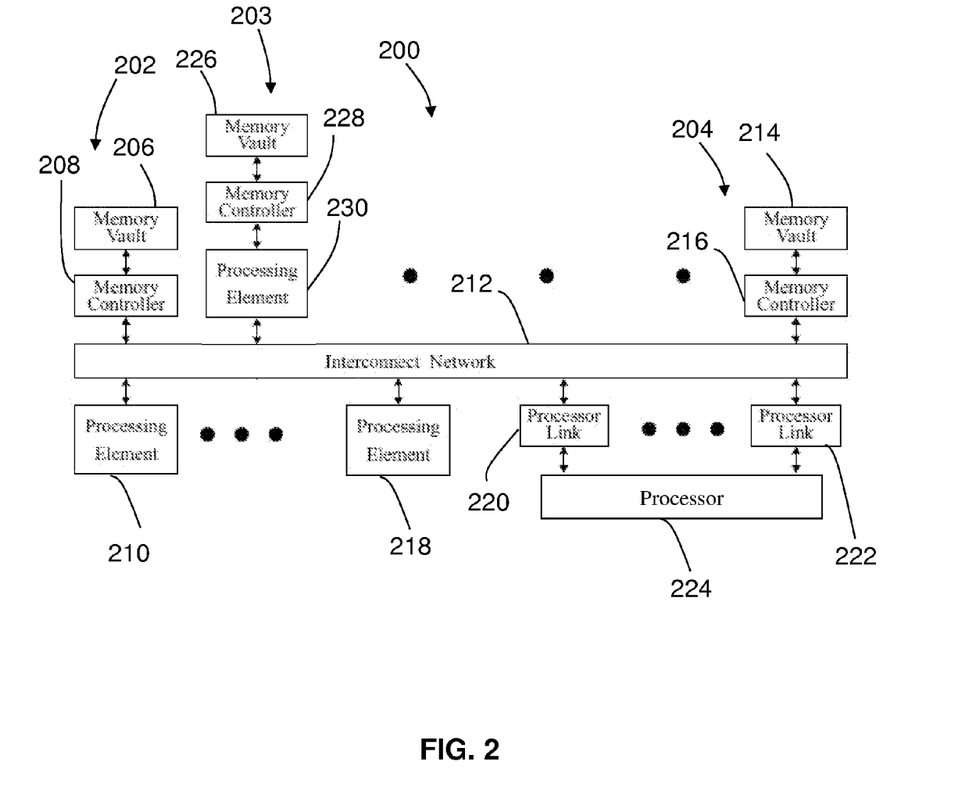
FIG. 2 illustrates a block diagram of a system with an active memory device in accordance with an embodiment.

FIG. 2 is a schematic diagram of an embodiment of a computer system 200 implementing dynamic memory page management. In one embodiment, the computer system 200 includes an active memory device 202, an active memory device 203 and an active memory device 204. The active memory device 202 includes a memory vault 206, a memory controller 208 and a processing element 210. In an embodiment, the processing element 210, memory vault 206 and memory controller 208 are coupled and communicate via an interconnect network 212. Specifically, the processing element 210 communicates to the memory vault 206, memory controller 208 and other memory devices, such as active memory devices 203 and 204, via the interconnect network 212. The interconnect network 212 is also coupled to a main processor 224 by processor links 220 and 222. The interconnect network 212 provides a fast and high bandwidth path for communication between portions of the device, such processing elements, memory controllers and memory, to provide improved performance and reduced latency for the active memory.

The active memory device 203 includes a memory vault 226, a memory controller 228 and a processing element 230.

In an embodiment, the processing element 230, memory vault 226 and memory controller 228 are all located on the same side of the interconnect network 212, such as within a single stack. By positioning the processing element 230 in the same stack as memory vault 226, the latency is reduced when accessing locations in the memory vault 226, thus further improving performance. In one embodiment, the active memory 204 includes a memory vault 214 and memory controller 216 coupled to processing elements 210 and processing element 218 via the interconnect network 212. As depicted, the processing element 218 is located on the other side of the interconnect network 212 from the memory controller 216 and memory vault 214. In embodiments, the active memory devices 202, 203 and 204 include multiple layers of stacked addressable memory elements. Further, the stack's memory may be divided into memory vaults 206, 226 and 214, or three-dimensional blocked regions of the memory device which share a common memory controller and/or memory element, and are capable of servicing memory access requests to their domain of memory independently of one another.

In embodiments, the processing elements, memory vaults and memory controllers may be arranged in a suitable manner depending on the application. For example, one or more processing elements, such as processing element 218, may be positioned on one side of the interconnect network 212 and may operate as a pool of processing elements that are available for accessing any memory in the memory system coupled to the interconnect network 212. The pooled processing elements are not limited to accessing a particular memory vault and, thus, one or more elements may be utilized upon receiving a command from the main processor 224. Accordingly, processing element 218 may be configured to access each memory vault 206, 226 and 214. In another embodiment, one or more processing elements, such as processing element 230, is located as part of a stack including a memory vault 226 and memory controller 228. In such a configuration, the processing element 230 is configured to access memory vault 226 coupled to the interconnect network 212, including memory vaults 206 and 214. In one embodiment, one or more processing element, such as processing element 210, is positioned on an opposite side of the interconnect network 212 from the memory vault 206 and memory controller 208. In the configuration, the processing element 210 is configured to access any memory coupled to the interconnect network 212, including memory vaults 226 and 214.

Figure 3:
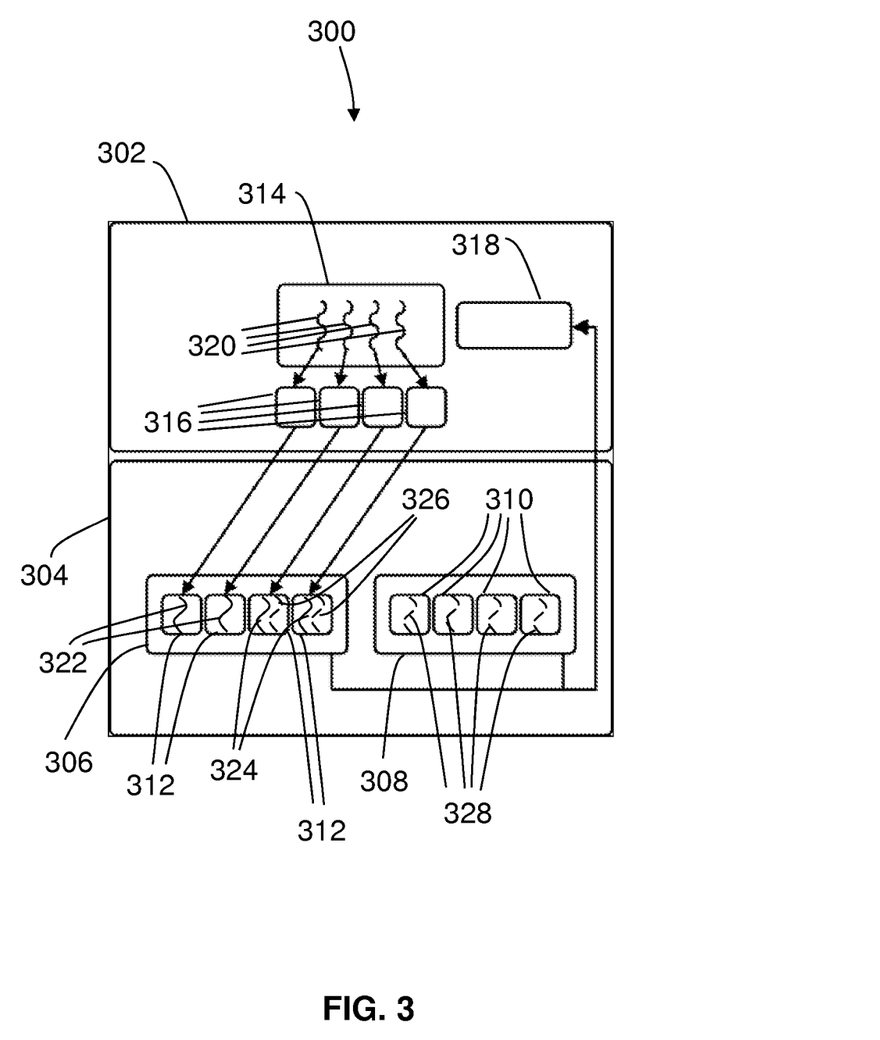
FIGS. 3 and 4 are block diagrams of a computer system having a power saving feature in accordance with an embodiment.
Figure 4:
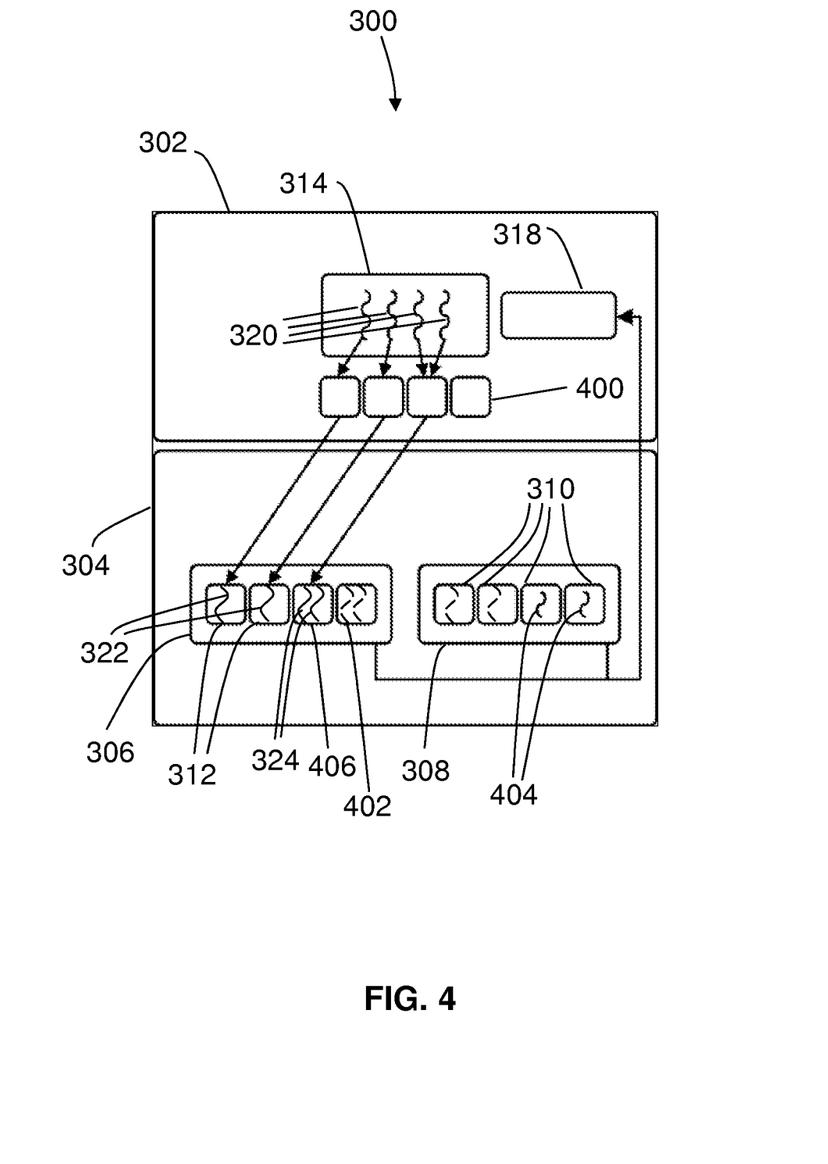

FIGS. 3 and 4 are block diagrams of a computer system 300 having a power saving feature according to an embodiment. The computer system 300 includes an operating system (OS) 302 and system hardware 304. The system hardware 304 includes a multi-core processing chip 306 and accelerator chip 308. In an embodiment, the multi-core processing chip 306 has a plurality of physical cores 312 where the cores each have one or more hardware threads capable of receiving and executing corresponding software threads. The accelerator chip 308 includes accelerator units 310 where the accelerator units can execute software threads or tasks created and assigned by other software threads executing in the multi-core processing chip. In an embodiment, the accelerator chip 308 is a processing element of an active memory device and the multi-core processing chip 306 is a main processor, such as those described in FIGS. 1 and 2. In an embodiment, accelerator units are units coupled to a processing device (e.g., main processor) that receive tasks or threads for execution to accelerate execution of an application. Accordingly, the accelerator units 310 in the accelerator chip 308 are processing elements in the active memory device configured to execute threads or tasks assigned by other software threads executing in the multi-core processing chip. In an embodiment, the OS 302 also includes application 314 utilizing software threads 320 to execute code. The control module 318 maps or assigns software threads 320 from the application 314 to physical cores 312 configured to execute the threads. In embodiments, the software threads 320 are mapped to logical cores 316 in the OS 302, where the logical cores are then mapped to corresponding physical cores 312. Accordingly, hardware threads 322 and 324 in the physical cores 312 receive the software threads 320 and begin execution of the threads. In embodiments, physical cores 312 and accelerator units 310 each have one or more hardware threads that are configured to receive and execute threads from an application, such as software threads 320. In an embodiment described below, the accelerator units 310 receive child threads spawned by parent threads executing in physical cores 312. As discussed herein, physical cores, accelerator units and hardware threads that have not received threads or are not executing threads may be referred to as idle. In an embodiment, the controller module 318 obtains hardware-level execution information (e.g., performance counters, power consumption, temperature, etc.) from the multi-core processing chip 306 and the accelerator chip 308. In an embodiment, the controller 318 can relocate software threads between cores 312 in the multi-core processing chip 306 and between accelerator units 310 in the accelerator chip 308.

In an embodiment, one or more of the hardware threads 324 executes a software thread and initiates one or more child threads 404 to execute on the accelerator units 310. In embodiments, cores may have a plurality of hardware threads, where a portion of the hardware threads are idle while other hardware threads execute a software thread. Accordingly, idle hardware threads 326 on the physical cores 312 allow for consolidation of executing software threads in the multi-core processing chip 306. Specifically, software threads 320 are combined to execute on a consolidated physical core 406 (FIG. 4), where an idle hardware thread 326 in a first physical core 401 receives a software thread executing in a hardware thread 324 in a second physical core 402 to be idle. The consolidated physical core 406 is a physical core hosting a thread that is "reassigned" from a second physical core, where the second physical core may become idle after losing the reassigned thread. A corresponding logical core 400 is also idle and unused. In an embodiment, a power savings mode is activated for the physical core 402, where the power savings mode reduces power consumption in the computer system 300. In one embodiment, the thread consolidation and power savings mode is a mode where the core operates with a clock and/or signals at a lower frequency and/or voltage. In another embodiment, a portion of the components in the core are powered down in the power savings mode. In embodiments, the power savings mode is only activated when the application 314 is no longer providing threads for execution.

In an embodiment, one or more of the threads executing on hardware threads 324 is mapped or assigned to execute on one or more of the idle hardware threads 328 in the accelerator units 310. Following the mapping of threads for execution on the accelerator chip 308, one or more software threads executing in hardware threads 322, 324 may be consolidated resulting in the idle core 402 and the consolidated physical core 406. The core 402 then activates the power savings mode to reduce power consumption.

In an embodiment, the computer system 300 provides thread consolidation during execution of an application to reduce power consumption. In embodiments, the computer system 300 and controller module 318 with thread consolidation considers power consumption and application performance to guide thread assignment and consolidation actions. In addition, the controller module 318 may consider several factors when assigning threads between physical cores and accelerator units, such as the number of available hardware threads within accelerator units and the execution time for threads currently executing in the accelerator units. Other inputs for the controller module 318 during consolidation include the number of idle threads on the multi-core processing chip and the number and length of long-latency stall events. In an embodiment, the thread consolidation can enhance performance and efficiency by consolidating two threads that exchange data to execute on a single physical core, thus providing reduced latency. In addition, information relating to a thread's execution may be provided to the controller module 318 by the compiler, where this information is an input to a determination of which threads to consolidate and when to consolidate them. Specifically, the compiler may indicate that a particular software thread executing in a hardware thread 324 may spawn a long-duration task to execute in the accelerator units 310, where consolidation of that software thread would improve efficiency.

Figure 5:
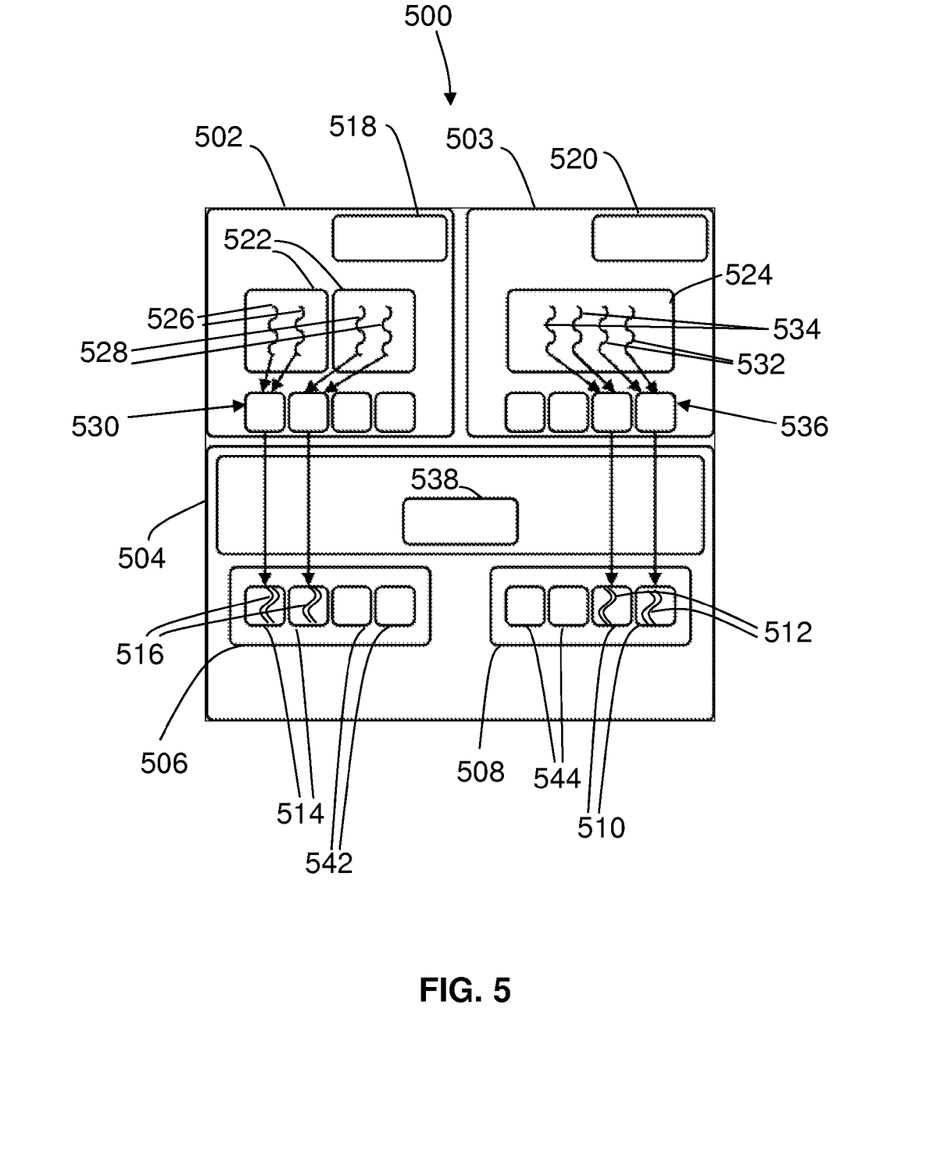
FIGS. 5 and 6 are block diagrams of a computer system having a power saving feature in accordance with another embodiment.
Figure 6:
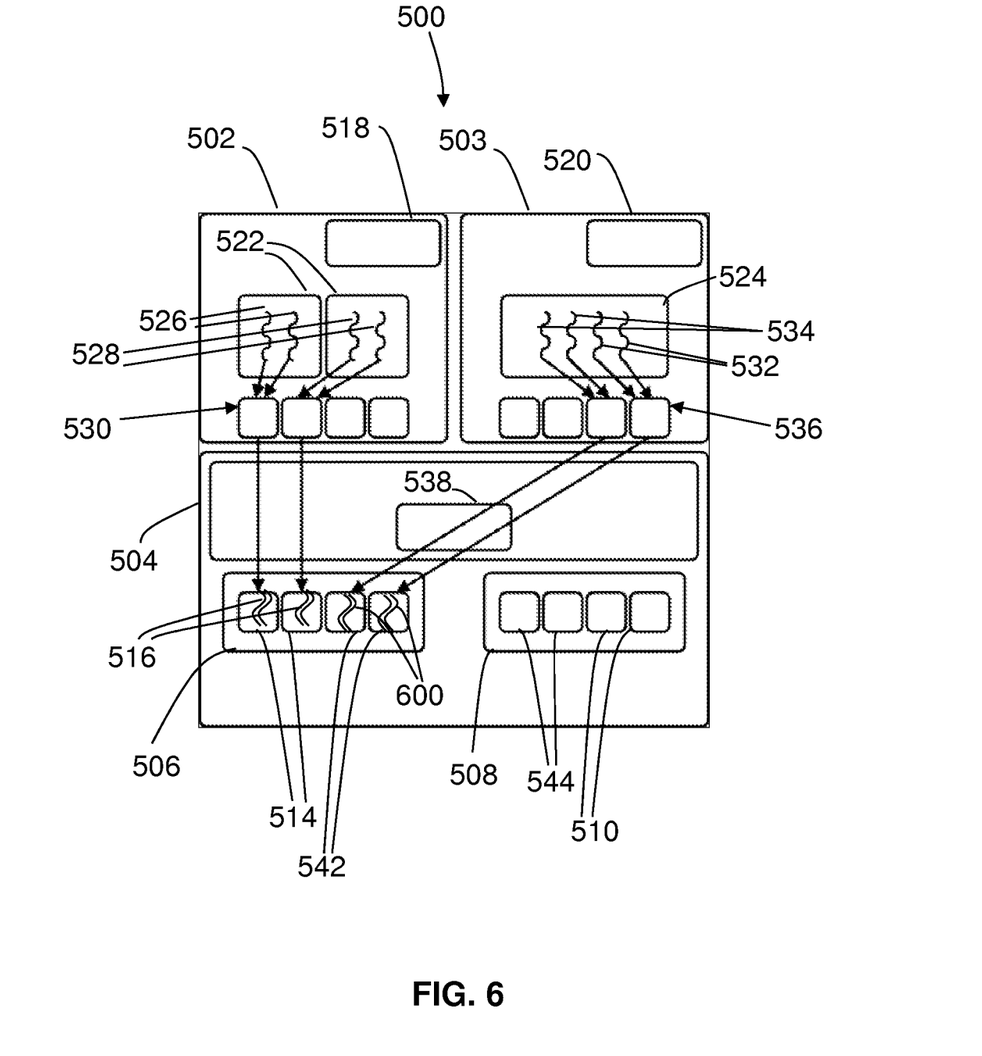

In an embodiment, the controller module 318 can "undo" an action if the resulting behavior is determined to be undesirable (e.g., performance is reduced more than a specified threshold). The controller module 318 may have an efficiency calculation based on performance and power consumption values before and after a thread mapping action. This efficiency calculation may be made at a selected interval (e.g., one calculation per second) to determine if the action should be "undone." In an embodiment, the calculated efficiency is compared to a threshold value, where the action is undone when the efficiency is below the threshold value. The thread consolidation efficiency calculation may be performed after each thread assignment action and may be used for any of the thread consolidation embodiments described herein. FIGS. 5 and 6 are block diagrams of a computer system 500 having a power saving feature according to an embodiment. The computer system 500 includes operating systems (OSes) 502 and 503 as well as system hardware 504. In an embodiment, the OSes 502 and 503 are partitions of the computer system 500. The operating systems 502 and 503 include controller modules 518 and 520, respectively. In addition, operating systems 502 and 503 host applications 522 and 524, respectively. Operating system 502 also includes logical cores 530 where software threads 526 and 528 are mapped to the logical cores 530. In an embodiment, the logical cores 530 map the software threads 526 and 528 to corresponding physical cores 514 in a multi-core processing chip 506. Similarly, operating system 503 includes logical cores 536 where software threads 532 and 534 are mapped to the logical cores 536. In an embodiment, the logical cores 536 map the software threads 532 and 534 to corresponding physical cores 510 in a multi-core processing chip 508. In embodiments, the logical cores 530 and 536 each receive two or more software threads. Accordingly, as depicted in FIG. 5, two physical cores 514 and two physical cores 510 each receive and execute two software threads. Accordingly, physical cores 542 and 544 are idle if the application is not executing additional threads. In embodiments, idle physical cores may be assigned to other partitions if they are not placed in a power savings mode.

In an embodiment, the computer system 500 provides thread consolidation during execution of an application to reduce power consumption. In embodiments, aspects of the multi-processor device 504 are managed by a hypervisor 540 and a controller module 538 in the hypervisor 540. As shown in FIG. 6, the controller module 538 maps software threads 532 and 534 to execute on the multi-core processing chip 506, leaving physical cores 510 and 544 in the multi-core processing chip 508 in an idle state. In other embodiments, controller modules 518 and 520 control mapping of the software threads 526, 528, 532 and 534. In yet another embodiment, controller modules 518 and 520 share control with the control module 538 to map the software threads 526, 528, 532 and 534. With continued reference to FIG. 6, after the software threads 532 and 534 execute in hardware threads 600 of the physical cores 542, a power savings mode is activated for the physical cores 510 and 544. In embodiments, a power saving mode is activated for the entire multi-core processing chip 508 if all its physical cores 510 and 544 are idle. The power savings mode is activated if no additional threads are to be executed from the applications 522 and 524. In embodiments, the controller module(s) base the thread consolidation with physical cores 514 and 542 on data exchanges between threads on separate cores, such as threads 516 or 600. In an embodiment, an exchange of data between threads executing in separate physical cores may add to latency during execution. Specifically, maintaining coherence or accurate copies of data values in separate cores can delay code execution. Thus, by mapping execution of threads 600 to physical cores 542, latency may be reduced when threads executing in the same core exchange data. Accordingly, in embodiments, control modules 518, 520 and 538 based thread consolidation, at least in part, on data exchanges between threads executing on separate physical cores. In embodiments, mapping of threads 526, 528, 532, 534 to physical cores 514, 542 is done by OSes 502, 503.

Figure 7:
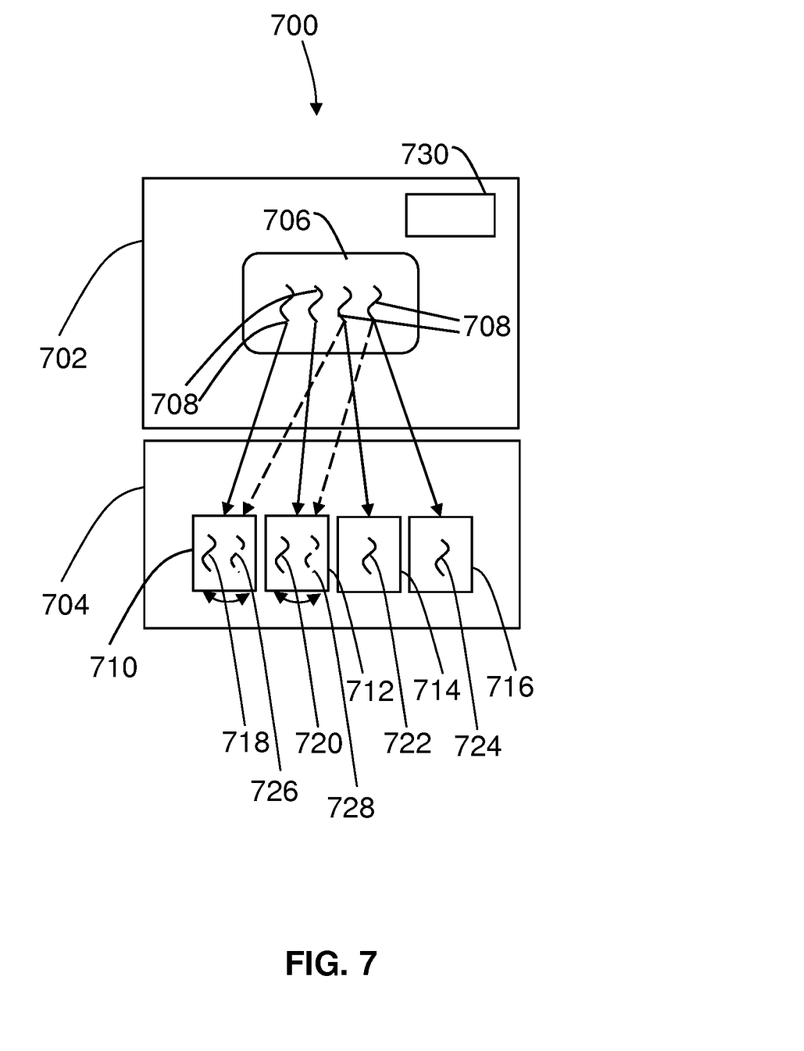
FIG. 7 is a block diagram of a computer system having a power saving feature in accordance with yet another embodiment.

FIG. 7 is a block diagram of a computer system 700 having a power saving feature according to an embodiment. In an embodiment, the computer system 700 provides thread consolidation during execution of an application to reduce power consumption. The computer system 700 includes an operating system (OS) 702 and a multi-core processing chip 704. An application 706 running on the OS 702 executes code using software threads 708 that are mapped to physical cores 710, 712, 714 and 716 in the multi-core processing chip 704. In embodiments, a controller module 730 in the OS 702 controls mapping of the software threads 708. In one embodiment, the software threads 708 may be mapped to each physical core, where the physical core 710 hosts a thread 718, the physical core 712 hosts a thread 720, the physical core 714 hosts a thread 722 and the physical core 716 hosts a thread 724. In cases where threads are executed on separate physical cores, inter-core data exchange can increase latency by maintaining coherence of data (e.g., up-to-date data values) between the cores. In an embodiment, the controller module 730 consolidates thread execution, where threads 722 and 724 are mapped to execute on physical cores 710 and 712, respectively, where they execute as threads 726 and 728 following the mapping. In the embodiment, physical cores 710 and 712 are available to receive and execute threads in addition to threads 718 and 720. In particular, physical cores 710 and 712 have idle hardware threads prior to a thread consolidation process. After thread consolidation, physical cores 714 and 716 are idle if the application 706 ceases thread assignment. Accordingly, idle physical cores 714 and 716 activate a power savings mode to reduce power consumption in the multi-core processing chip 704. In addition, the controller module 730 consolidates threads to reduce inter-core data exchange between threads on separate cores. Thus, by combining threads 718 and 726 to execute on the single physical core 710, data exchange between threads 718 and 726 is improved to reduce latency as compared to when the threads execute on separate cores. Similarly, by combining threads 720 and 728 to execute on the single physical core 712, data exchange between threads 720 and 728 is improved to reduce latency.

Technical effects and benefits include a system and method that provides reduced latency and power consumption by consolidating threads on physical cores in a multi-core processing chip. In an embodiment, data exchange between threads is also consolidated to reduce latency during execution of threads in the processing chip. In another embodiment, parent threads spawn child threads that execute on an accelerator chip, where the parent threads are consolidated in physical cores of the multi-core processing chip, thus providing an idle core that is set to a power savings mode.

According an embodiment, a system and a method for thread consolidation in a system that includes a multi-core processing chip and an operating system is provided, where the method includes running an application having software threads on the operating system, mapping a first software thread to a first physical core in the multi-core processing chip, mapping a second software thread to a second physical core in the multi-core processing chip and executing the first software thread and second software thread on the first and second physical cores, respectively. The method also includes the controller module consolidating the first software thread and second software thread to execute in the first physical core, exchanging data between the first software thread and second software thread within the first physical core to reduce latency during execution and activating a power savings mode for the second physical core.

In one embodiment, the controller module is located in the operating system.

In one embodiment, the controller module is located in a hypervisor in the multi-core processing chip.

In one embodiment, mapping the first software thread to the first physical core further comprises mapping the first software thread to a first logical core in the operating system and mapping the first logical core to the first physical core in the multi-core processing chip; and mapping the second software thread to the second physical core further comprises mapping the second software thread to a second logical core in the operating system and mapping the second logical core to the second physical core in the multi-core processing chip.

In one embodiment, the method further comprises identifying, by the controller module, an idle hardware thread in the first physical core.

In one embodiment, mapping the first software thread to the first physical core further comprises mapping the first software thread to a first hardware thread located in the first physical core; and mapping the second software thread to the second physical core further comprises mapping the second software thread to a second hardware thread located in the second physical core, wherein the first and second hardware threads are idle. In one embodiment, consolidating the first software thread and second software thread to execute in the first physical core further comprises assigning the second software thread from the second physical core to execute on a third hardware thread on the first physical core, thus causing the second physical core to become idle and saving power in the multi-core processing chip.

In one embodiment, the multi-core processing chip is a multi-thread enabled chip capable of supporting software threads executing simultaneously in the core.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for thread consolidation, the system comprising:
an operating system and a multi-core processing chip in communication with an configured to perform a method comprising:
running an application having software threads on the operating system;
mapping the software threads to physical cores in the multi-core processing chip;
identifying one or more idle hardware threads in the multi-core processing chip;
identifying one or more idle accelerator units in the accelerator chip;
executing the software threads on the physical cores and the accelerator unit;
obtaining, by the controller module, performance and power consumption information from the multi-core processing chip and the accelerator chip at predetermined intervals;
determining whether to consolidate the software threads based on performing an efficiency calculation, wherein the efficiency calculation is a function of the obtained performance and power consumption information at predetermined intervals before consolidation;
consolidating, by the controller module, the software threads executing on the physical cores, resulting in one or more idle physical cores and a consolidated physical core, the consolidating responsive to the obtained performance and power consumption information;
activating, by the controller module, a power savings mode for the one or more idle physical cores;
performing an additional efficiency calculation based on performance and power consumption values obtained before and after the consolidating;
comparing the calculated efficiency to a threshold value; and
undoing the consolidating if the calculated efficiency is below the threshold value.

2. The system of claim 1, further comprising:
consolidating, by the controller module, the software threads executing on the accelerator units to provide one or more idle accelerator units; and
activating, by the controller module, a power savings mode for the one or more idle accelerator units.

3. The system of claim 1, wherein the accelerator chip comprises an active memory device.

4. The system of claim 1, wherein:
executing the software threads on the physical cores and the accelerator unit further comprises executing parent threads on the physical cores, wherein the parent threads spawn child threads;
mapping one or more of the software threads to the accelerator unit further comprises mapping the child threads to the accelerator unit; and
consolidating the software threads executing on the physical cores further comprises consolidating the parent threads to execute on one of the physical cores to provide the one or more idle physical cores.

5. The system of claim 1, wherein mapping the software threads to physical cores further comprises mapping the software threads to logical cores in the operating system and mapping the logical cores to physical cores in the multi-core processing chip.

6. The system of claim 1, wherein identifying the accelerator unit further comprises identifying an idle hardware thread in the accelerator unit.

7. The system of claim 1, wherein mapping the software threads to physical cores further comprises mapping the software threads to idle hardware threads located in the physical cores.

8. The system of claim 7, wherein mapping the software threads to the accelerator unit further comprises causing a first hardware thread in a first physical core to become idle, the first physical core being one of the physical cores.

9. The system of claim 8, wherein consolidating the software threads further comprises assigning a software thread from a second physical core to execute on the first hardware thread, thus causing the second physical core to become idle and saving power in the multi-core processing chip.

* * * * *